July 27, 1926.
R. L. CLEVELAND
1,593,867
ENVELOPE SEALING AND POSTAGE STAMP AFFIXING MACHINE
Filed Oct. 16, 1923    7 Sheets-Sheet 1
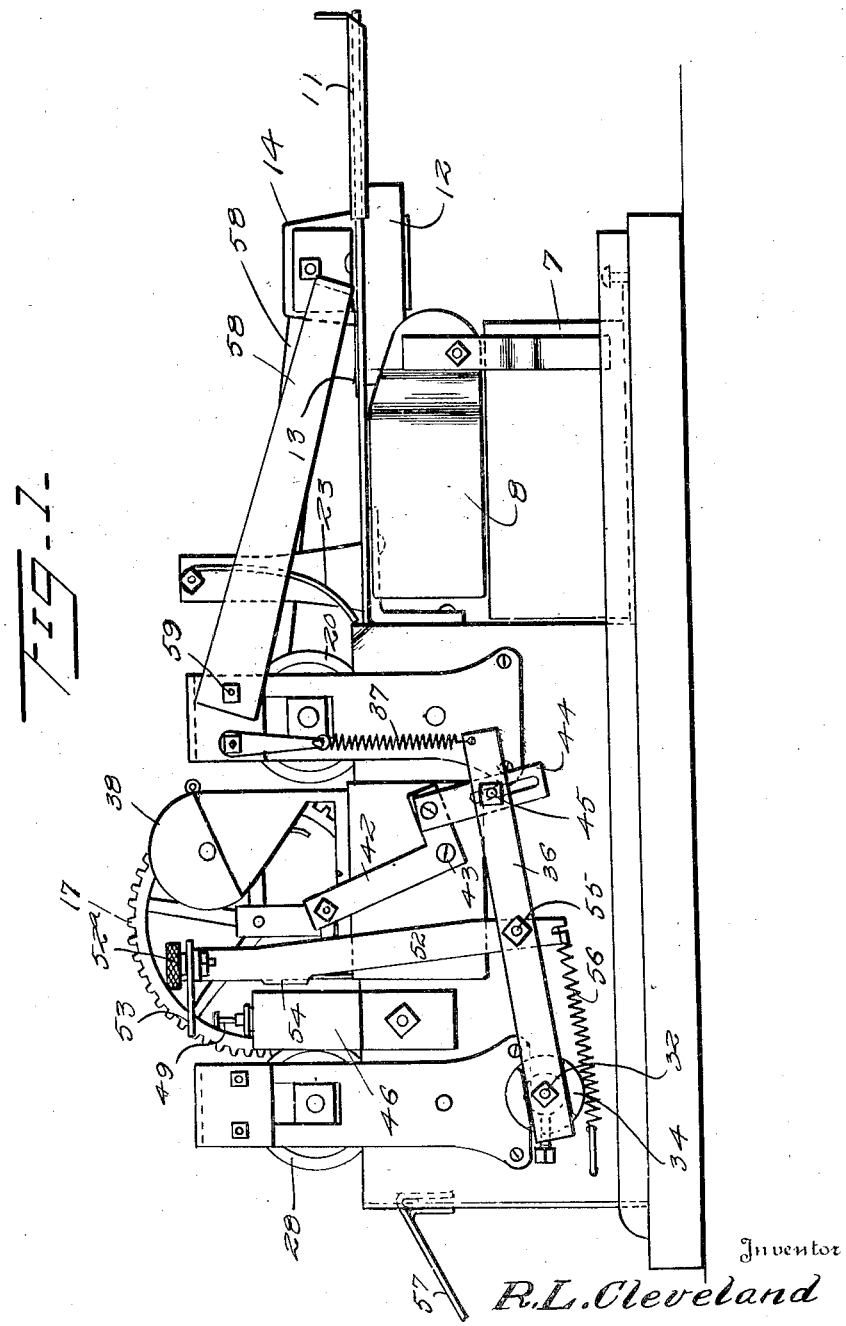
Inventor
R. L. Cleveland
By
Attorney July 27, 1926.
R. L. CLEVELAND
1,593,867
ENVELOPE SEALING AND POSTAGE STAMP AFFIXING MACHINE
Filed Oct. 16, 1923    7 Sheets-Sheet 2
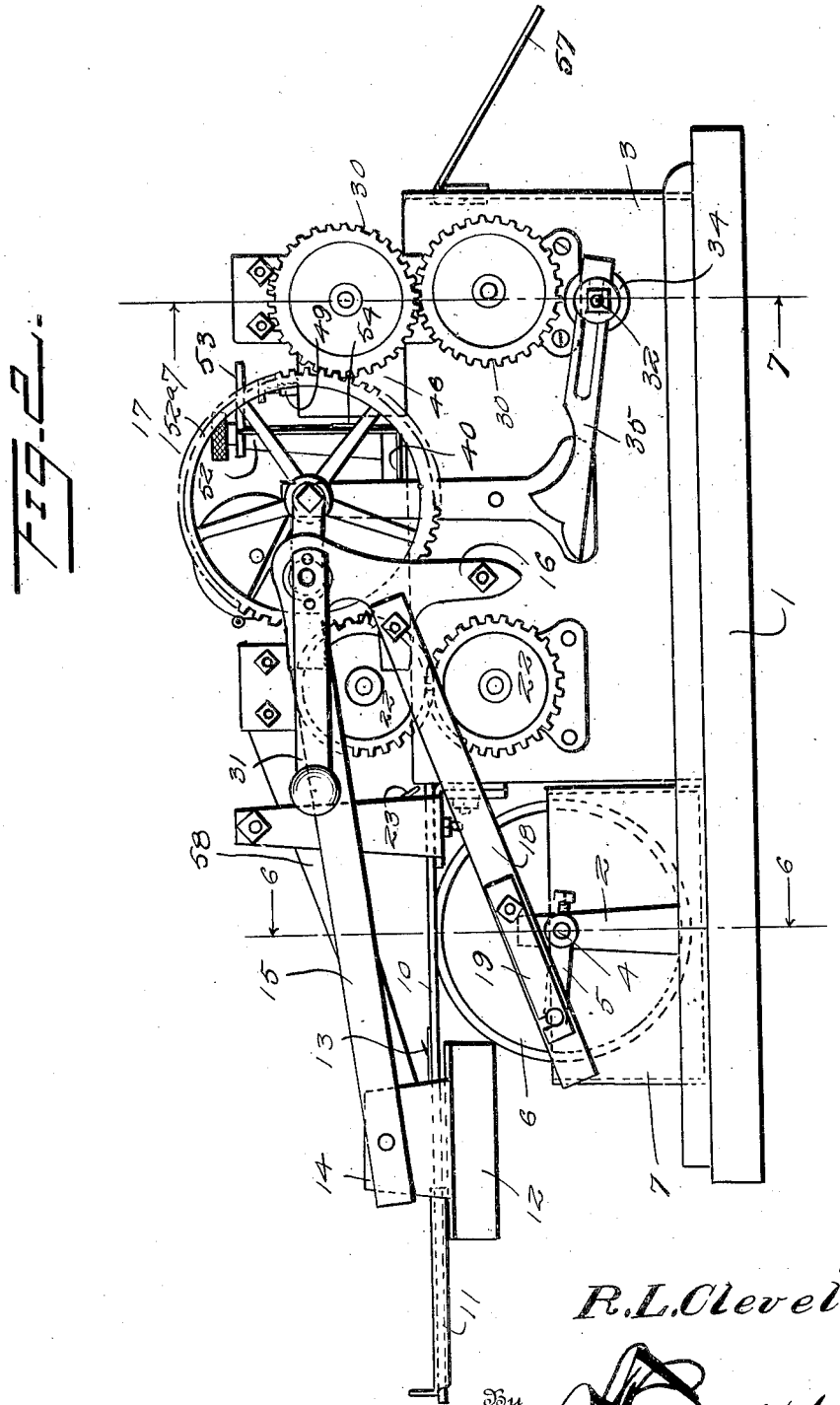
Inventor
R. L. Cleveland.
By 
Attorney

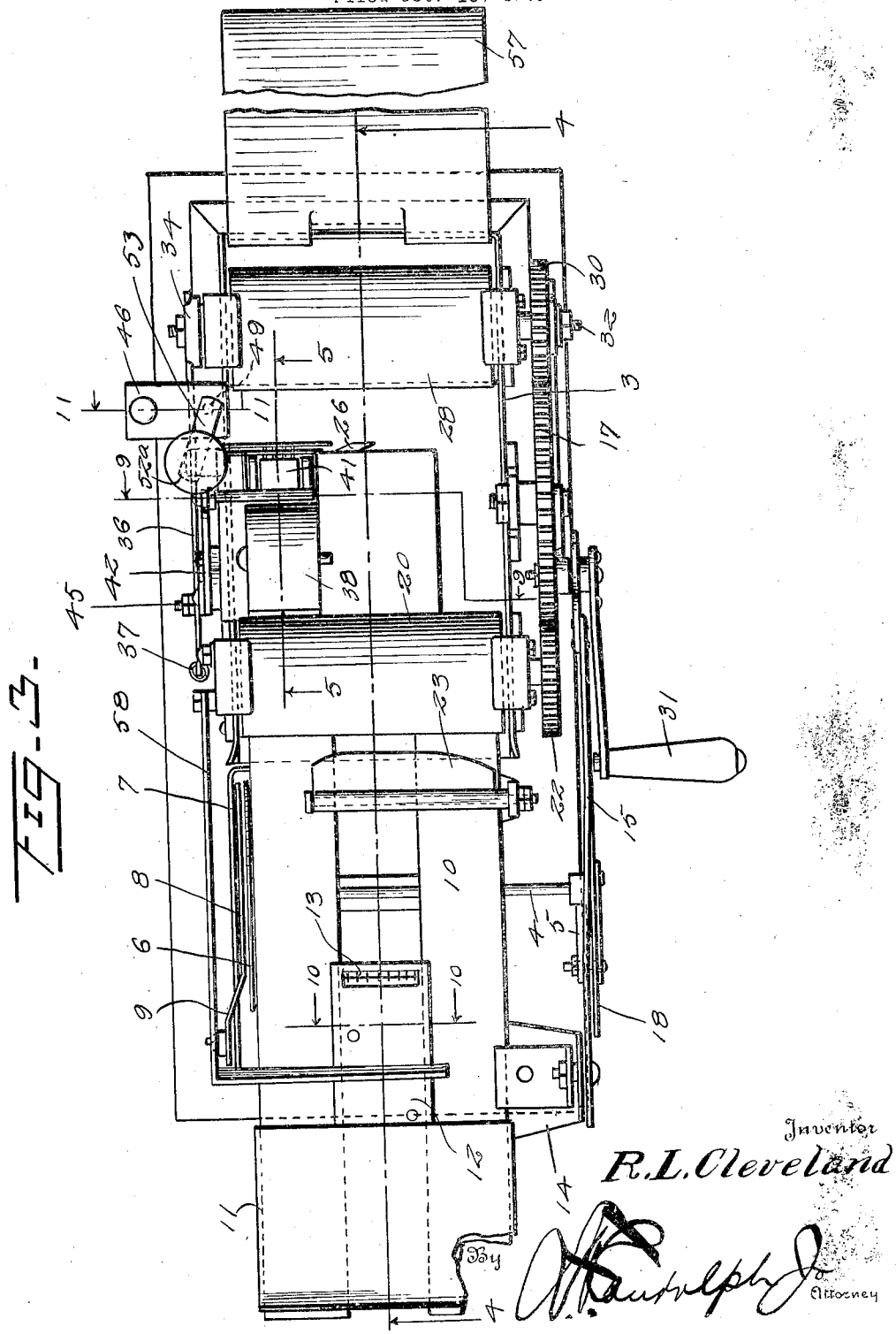

July 27, 1926.
R. L. CLEVELAND
1,593,867
ENVELOPE SEALING AND POSTAGE STAMP AFFIXING MACHINE
Filed Oct. 16, 1923 7 Sheets-Sheet 4
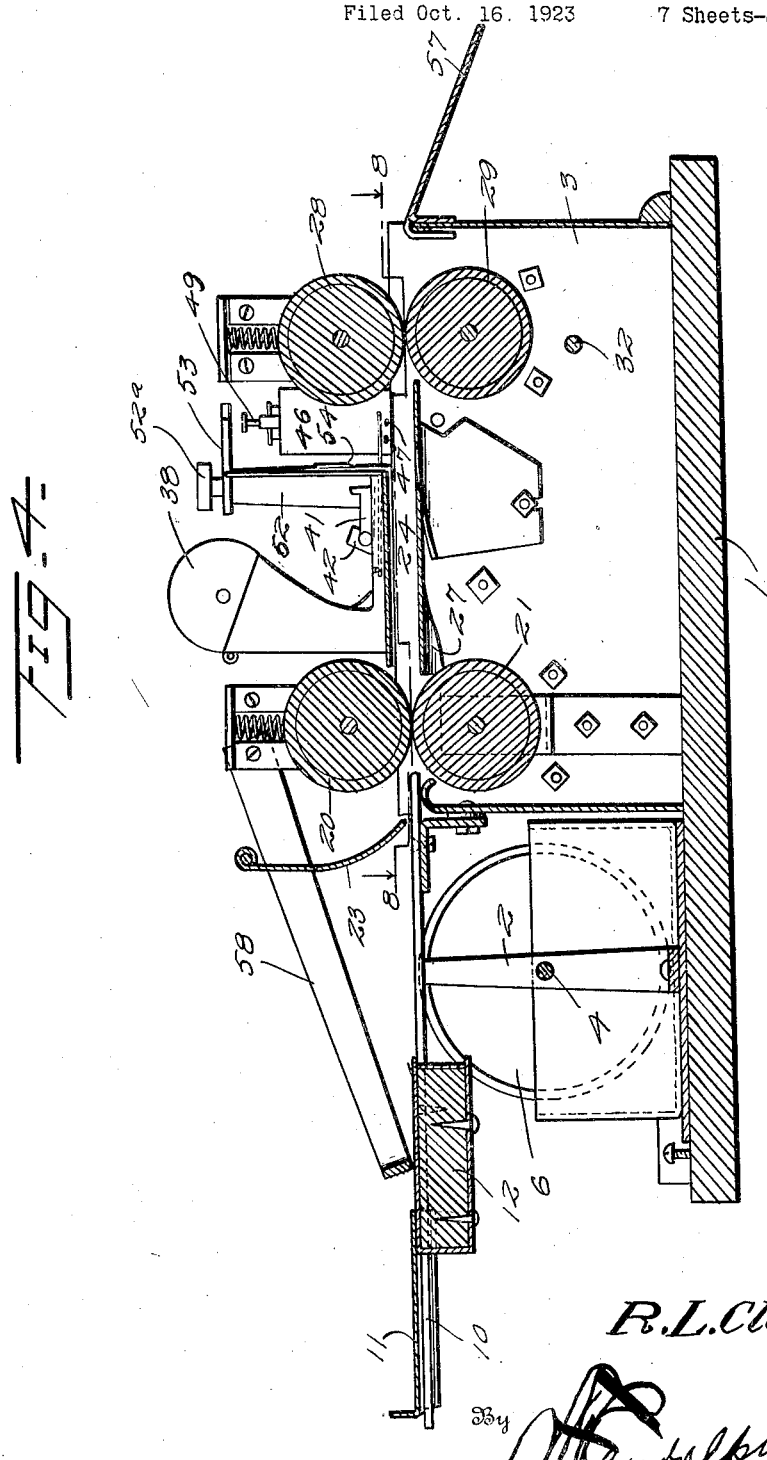
Fig. 4.
Inventor
R. L. Cleveland
By
Attorney July 27, 1926.
R. L. CLEVELAND
ENVELOPE SEALING AND POSTAGE STAMP AFFIXING MACHINE
Filed Oct. 16, 1923    7 Sheets-Sheet 5
1,593,867
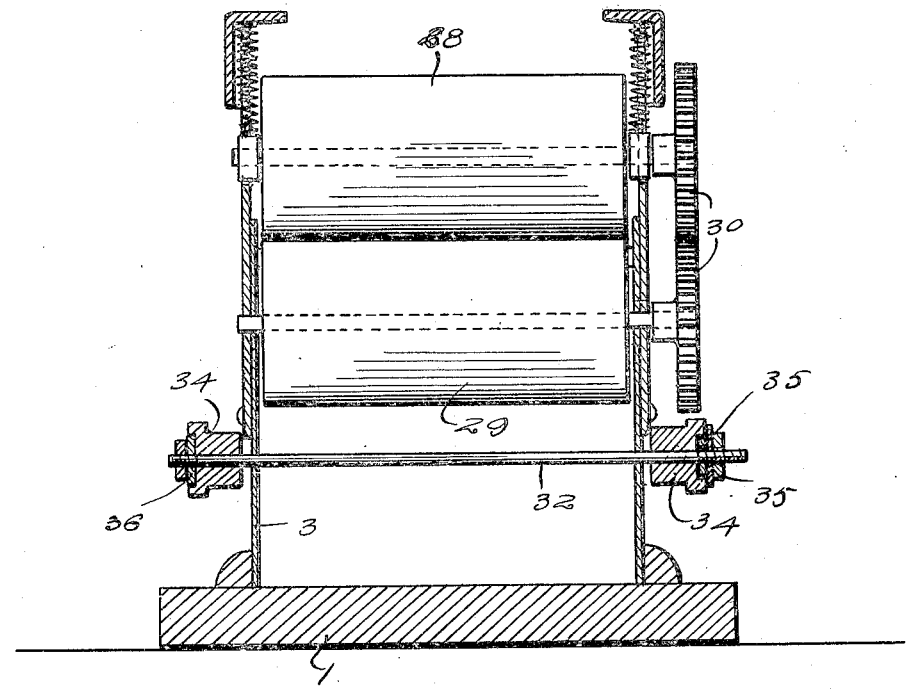
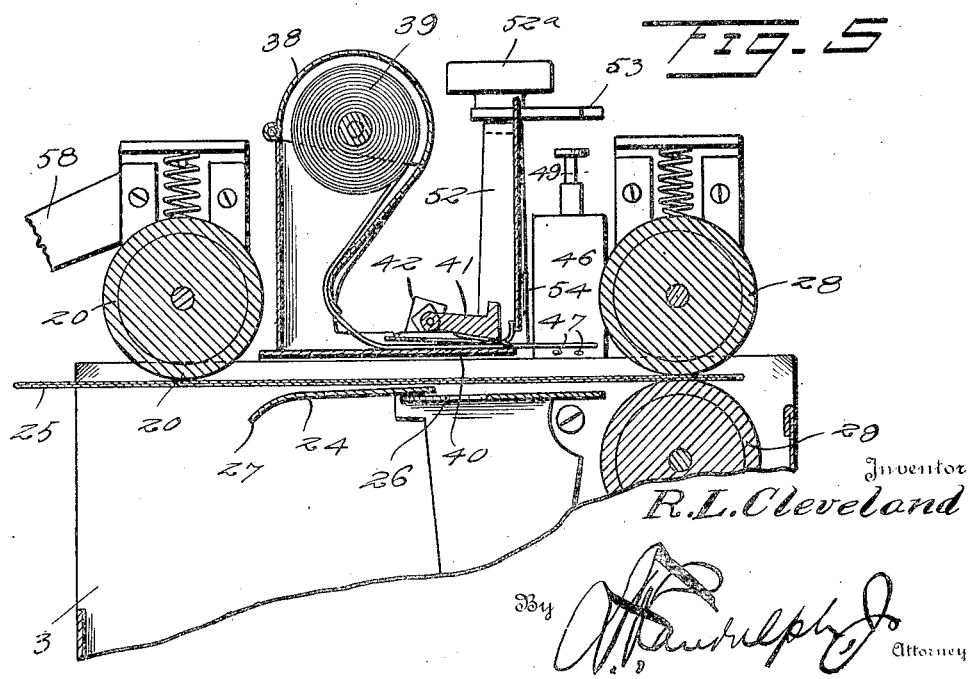
Inventor
R. L. Cleveland July 27, 1926.
R. L. CLEVELAND
1,593,867
ENVELOPE SEALING AND POSTAGE STAMP AFFIXING MACHINE
Filed Oct. 16, 1923      7 Sheets-Sheet 6
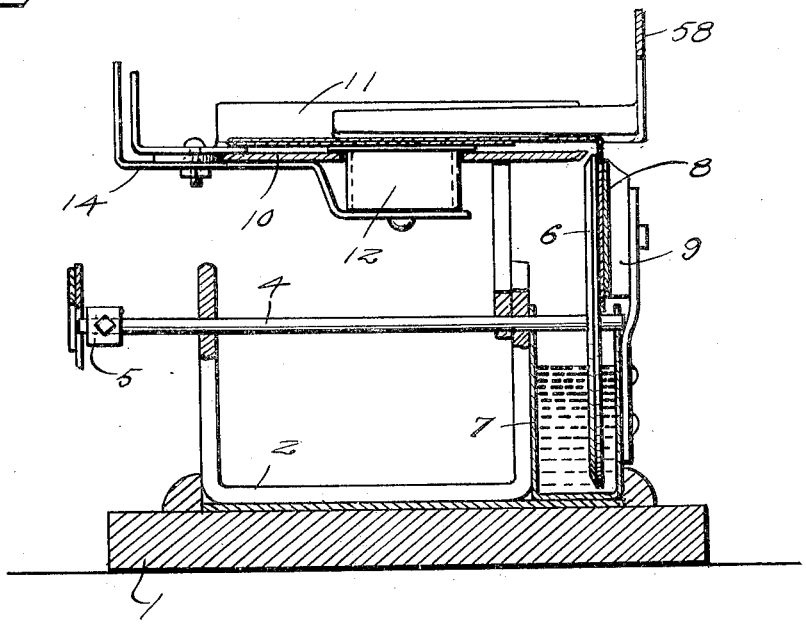
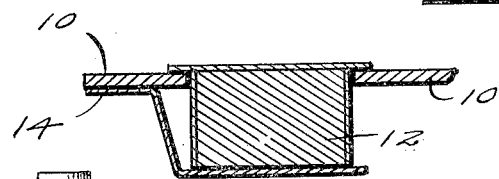
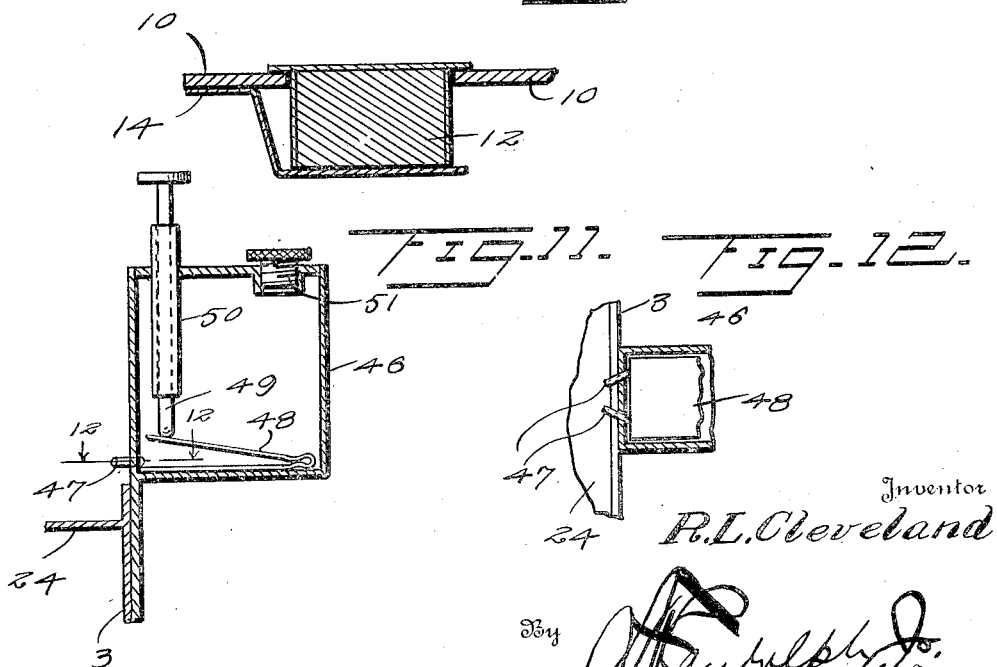
Inventor
R. L. Cleveland
By
Attorney July 27, 1926.
R. L. CLEVELAND
1,593,867
ENVELOPE SEALING AND POSTAGE STAMP AFFIXING MACHINE
Filed Oct. 16, 1923     7 Sheets-Sheet 7
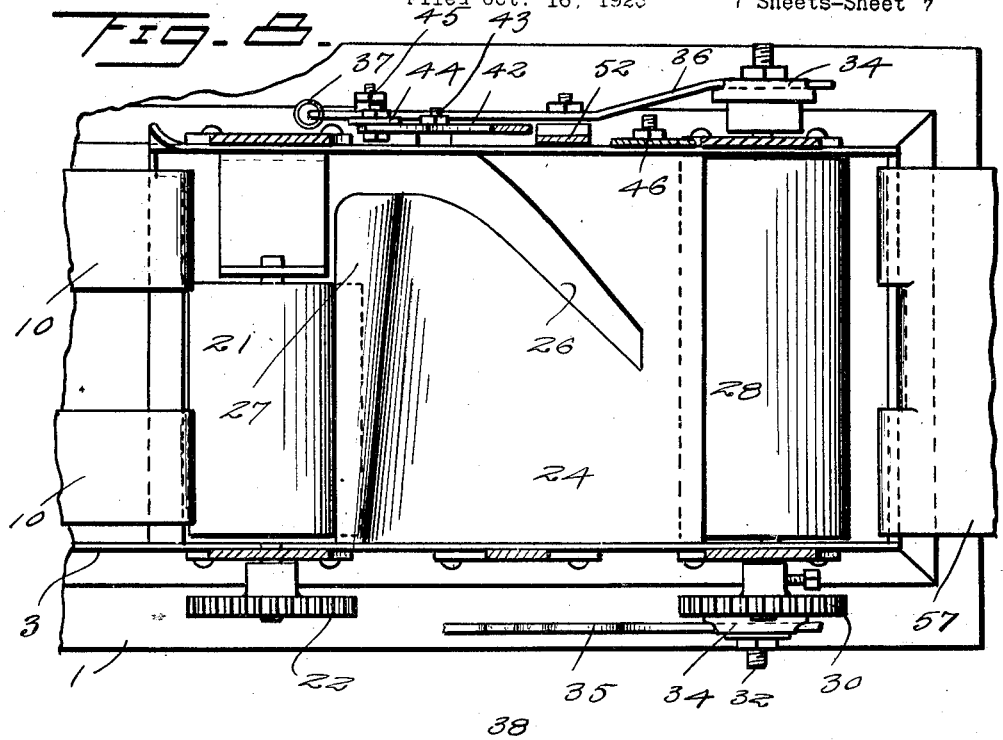
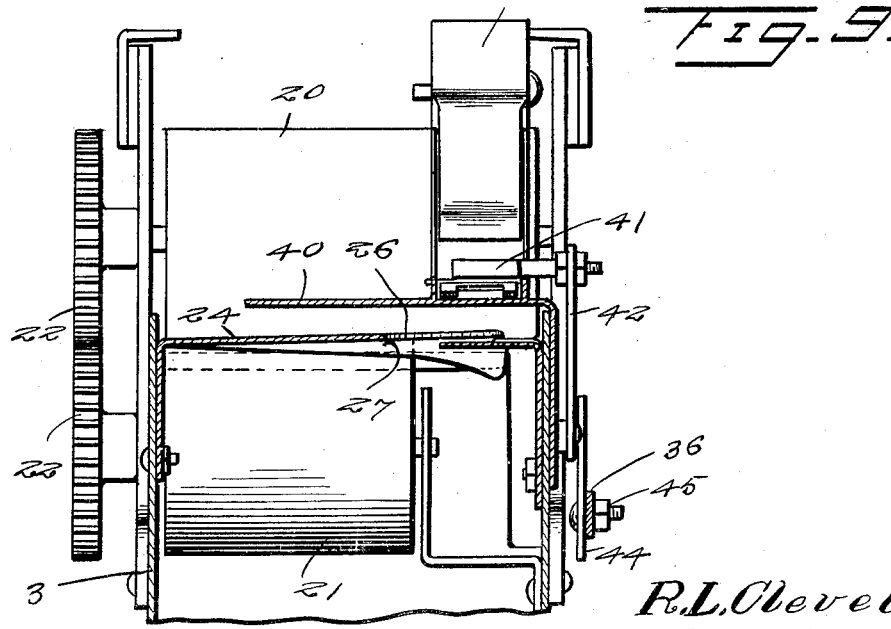
Inventor
R. L. Cleveland
By
Attorney Patented July 27, 1926.

1,593,867

UNITED STATES PATENT OFFICE.

RIENZI L. CLEVELAND, OF GREAT FALLS, MONTANA.

ENVELOPE-SEALING AND POSTAGE-STAMP-AFFIXING MACHINE.

Application filed October 16, 1923. Serial No. 668,894.

The present invention has for its object the provision of a machine for sealing envelopes and attaching postage stamps thereto in a single operation, thereby greatly facilitating the work of mailing circular letters and correspondence of large volume.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:—

Figure 1 is a side view of a machine embodying the invention,

Figure 2 is an elevational view of the machine as seen from the reverse side,

Figure 3 is a top plan view thereof,

Figure 4 is a vertical longitudinal section on the line 4—4 of Figure 3,

Figure 5 is a detail sectional view on the line 5—5 of Figure 3, showing the parts on a larger scale, Figure 6 is a transverse sectional view on the line 6—6 of Figure 2, looking to the left as designated by the arrows.

Figure 7 is a view similar to Figure 6, taken on the line 7—7 of Figure 2, looking to the right as indicated by the arrows, Figure 8 is a detail horizontal sectional view on the line 8—8 of Figure 4, Figure 9 is a vertical transverse section on the line 9—9 of Figure 3, looking to the left as indicated by the arrows, Figure 10 is a sectional detail on the line 10—10 of Figure 3, Figure 11 is a detail sectional view on the line 11—11 of Figure 3, and Figure 12 is a detail sectional view on the line 12—12 of Figure 11.

Corresponding and like parts are referred to in the following description and designated in the several views of the drawings by like reference characters.

The framework of the machine may be of any preferred construction and arrangement best adapted for supporting the working parts and, as shown, comprises a base 1, a bracket 2 at one end of the base, and a hollow framing 3 mounted upon the opposite end portion of the base. A transverse shaft 4 is mounted in the bracket 2 and is provided at one end with a crank arm 5 and at its opposite end with a moistening wheel 6 which is arranged to operate in a tank 7 containing water for moistening the gum applied to the sealing flaps of envelopes. A combined guide and pressure plate 8 is disposed exterior to the tank 7 and coacts with the moistening wheel 6 to direct the sealing flap of the envelope to the moistening wheel and press the same in contact therewith to insure moistening of the adhesive whereby said flaps are made secure when the envelope is sealed. The plate 8 is resilient and its forward portion is laterally offset in an outward direction, as indicated most clearly in Figure 3, whereby to engage the sealing flap of an envelope and direct the same inwardly towards the moistening wheel.

A table 10 is disposed horizontally and extends forwardly from the framing 3 and overhangs the bracket 2 and tank 7. The outer or forward end of the table 10 receives a plate 11 which is adjustable thereon and which serves as a gage to insure proper position of the envelope. The table is longitudinally slotted and receives a slide 12 which constitutes a feeder for initially advancing the envelopes in the operation of the machine. The feeder 12 is provided with a plurality of points 13 which are inclined to the horizontal so that upon the outward movement of the feeder, the points 13 slide upon the underside of the envelope and upon the forward or inward movement of the feeder, said points 13 engage the envelopes and positively move the same forwardly. An arm 14 projects laterally and upwardly from a side of the feeder 12 and a pitman 15 connects the outer vertical end of the arm 14 with an arm 16 loosely mounted upon the wrist pin of a gear wheel 17. A pitman 18 connects the crank arm 5 with the arm 16 and is adapted to be detachably connected with the crank arm 5 to admit of throwing the feeding mechanism out of gear. A latch 19 pivoted to the pitman 18, admits of detachably connecting the pitman with the crank arm 5. The arm 16 is maintained in vertical position by reason of the arrangement and manner of connecting the pitmen 15 and 18 therewith and with the parts 12 and 5.

A pair of feed rolls is located at the inner end of the table 10 and at the upper forward portion of the framing 3 and comprises an upper roll 20 and a lower roll 21, the upper roll 20 being mounted in yieldable bearings whereby to readily adapt the space between the two rolls 20 and 21 to thickness or bulk of the envelopes passing therebetween. The rolls 20 and 21 are connected at one end by gearing 22 to cause the same to rotate at a uniform speed. The lower roll 21 is of a less length than the upper roll 20, whereby provision is had for clearance of the sealing flap of the envelope in the closing of the latter. A guide 23 is located in advance of the feed rolls and consists of a spring plate which is adapted to engage the inner end of the envelope and hold the same close to the table 10.

A plate 24 is horizontally disposed rearwardly of the pair of feed rolls 20 and 21 and is arranged about in line with the space formed between said feed rolls whereby to receive the envelope, as indicated most clearly by the reference numeral 25 in Figure 5. The plate 24 is formed with an inclined slot 26 which opens laterally at the side of the plate adjacent the flap moistener. The slot 26 is inclined inwardly and rearwardly and the forward portion of the plate 24 disposed inwardly of the slot 26 curves downwardly, as indicated at 27. The purpose of the slot 26 is to provide clearance for the moistened flap of the envelope so that the latter with the flap in closed position will occupy a position wholly above the rear portion of the plate 24 so as to pass between a pair of pressure rolls whereby the sealing is effected. These pressure rolls are designated by the numerals 28 and 29, the top roll 28 being yieldable for the same purpose as the top roll 20. The pressure rolls 28 and 29 are connected at one end by gearing 30, whereby they are rotated at a uniform speed. The gearing of the top rolls 20 and 28 is in mesh with the gear wheel 17, as indicated most clearly in Figures 2 and 3. An operating crank 31 is connected with the gear wheel 17 and provides convenient means for operating the machine. However, it is to be understood that the same may be driven by a suitable motor which may be geared to the part 17 in any preferred way.

A transverse shaft 32 is mounted in the rear portion of the framing 3 and is provided at opposite ends with hubs 34. An arm 35 is adjustably connected with one of the hubs 34 and is disposed in the path of the arm 16 to be intermittently actuated thereby. An arm 36 is attached to the hub 34 at the opposite end of the shaft 32 and is normally held elevated at its free end by means of a spring 37.

A housing 38 is located at one side of the machine in the rear of the extended end of the top feed roll 20 and receives a roll 39 of postage stamps. A chute 40 is provided at the lower delivery end of the housing 38 to receive the loose end of the strip of postage stamps. This is shown most clearly in Figure 5 of the drawings. The upper portion of the chute 40 is cut away to provide clearance for a feeder 41 whereby the stamp strip is advanced. The stamp feeder 41 is connected to one arm of a bell crank 42 which is pivoted at 43, the other arm of the bell crank having a slotted link 44 pivoted thereto, the slot of said link receiving a pin or bolt 45 projecting laterally of the arm 36. At each operation of the arm 36, the stamp feeder 41 is actuated to advance a portion of the stamp strip equal to a postage stamp which is severed and applied to the envelope.

A tank 46 is located rearwardly of the housing 38 and exterior to the framing 3 and is adapted to contain water. The inner wall of the tank 46 is provided at its lower end with oppositely inclined nozzles 47 having minute openings through which the water is forced in the form of a spray. A spring pressure plate 48 is disposed within the bottom of the tank 46 and is operable by means of a plunger 49 working in a guide 50 secured to the top of the tank. The tank is supplied with water through a filling opening 51. The spring plate 48 normally holds the plunger 49 elevated. A bracket 53 carried by an arm 52 overhangs the plunger 49 and when depressed actuates the latter to effect delivery of a portion of the water from the tank 46 in the form of a spray which is delivered between the envelope 25 and the projecting end portion of the stamp strip which is adapted to be applied to the envelope. The arm 52 is provided with a blade 54 which operates to sever the projecting portion of the stamp strip which drops upon the envelope 25 and is pressed thereon by means of the rollers 28 and 29 between which the envelope and stamp pass. The arm 52 is pivotally connected to the arm 36, as indicated at 55 in Figure 1, and a spring 56 coacts with the arm 52 to hold the cutting blade 54 in operative position. A chute 57 is detachably fitted to the rear wall of the framing 3 and serves to direct the sealed and stamped envelope from the machine.

In the operation of the machine, the envelopes to be sealed and stamped are placed upon the table 10 and are properly positioned by means of the gage 11. A follower 58 pivoted at 59 rests upon the envelope to insure positive engagement of the points 13 of the feeder 12 therewith. Upon the forward or out stroke of the feeder 12, the points 13 ride upon the underside of the lowermost envelope and when the feeder 12 moves inwardly, the points 13 engage the envelopes and advance the same. It should be stated that the sealing flap of the envelope depends from a side of the table 10 and as the envelope is moved forwardly, the flap thereof engages the part 8 and is brought in contact with the wheel 6 and the gum thereof is moistened. In the continued forward movement of the envelope, the depending flap thereof enters the slot 26 of the plate 24 and is folded and brought against the lower side of the envelope and at this time the arm 16 engages the arm 35 and actuates the same whereby to rock the shaft 32 and operate the arm 36 with the result that a spray from the tank 46 moistens the stamp and the latter is severed from the stamp strip by means of the cutter 54 and the envelope and stamp pass between the rolls 28 and 29, whereby the stamp is affixed and the envelope sealed, the latter being delivered from the machine by means of the chute 57.

The arm 52 carrying the stamp cutter 54 is provided at its upper end with a knob 52ª. This admits of operating the arm 52 by hand when it is required to place additional stamps on extra heavy envelopes.

What is claimed is:—

1. In an envelope sealing machine, means to move the envelopes forwardly, means to moisten the adhesive of the sealing flaps of the envelopes when in a depending position, and a plate having an inclined slot, the plate bordering the rear side of the slot being inclined downwardly, the envelopes being movable over said plate and the flap engageable by the inclined portion thereof to fold the flap against the envelope.

2. A machine of the class described having presser means for the envelope, means to fold a sealing flap against the body of the envelope, an operating wheel, means to operate the presser means from said wheel, an arm pivoted to said wheel for actuation by the wheel, a feeding mechanism for the envelopes, a pitman connected to the arm and to said feeding mechanism, a moistening mechanism for the sealing medium of the envelope, and a pitman connecting said mechanism and said arm.

3. A machine of the class described having presser means for the envelope, means to fold a sealing flap against the body of the envelope, an operating wheel, means to operate the presser means from said wheel, an arm pivoted to said wheel for actuation by the wheel, a feeding mechanism for the envelopes, a pitman connected to the arm and to said feeding mechanism, a moistening mechanism for the sealing medium of the envelope, a pitman connecting said mechanism and said arm, a stamp applying mechanism, an arm to operate said mechanism and said arm being disposed in the path of movement of the first mentioned arm for operation thereby in proper sequence.

4. A machine of the class described having a shaft, means to intermittently rock said shaft, an arm adapted to be rocked by said shaft, a feeder for stamps, a bell crank lever connected to said feeder and to said arm, a moistener for the stamps, a second arm, said second arm being pivotally connected to the first arm between the feeder and the shaft, cutting means for the stamps associated with the second arm, and operating means for the moistening means associated with the second arm.

In testimony whereof I affix my signature.

RIENZI L. CLEVELAND.